No. 645,496. Patented Mar. 13, 1900.
W. H. SPRINGER & C. J. JOHNSON.
MEANS FOR WATERPROOFING COMPO-BOARD.
(Application filed Mar. 28, 1898.)
(No Model.) 2 Sheets—Sheet 1.
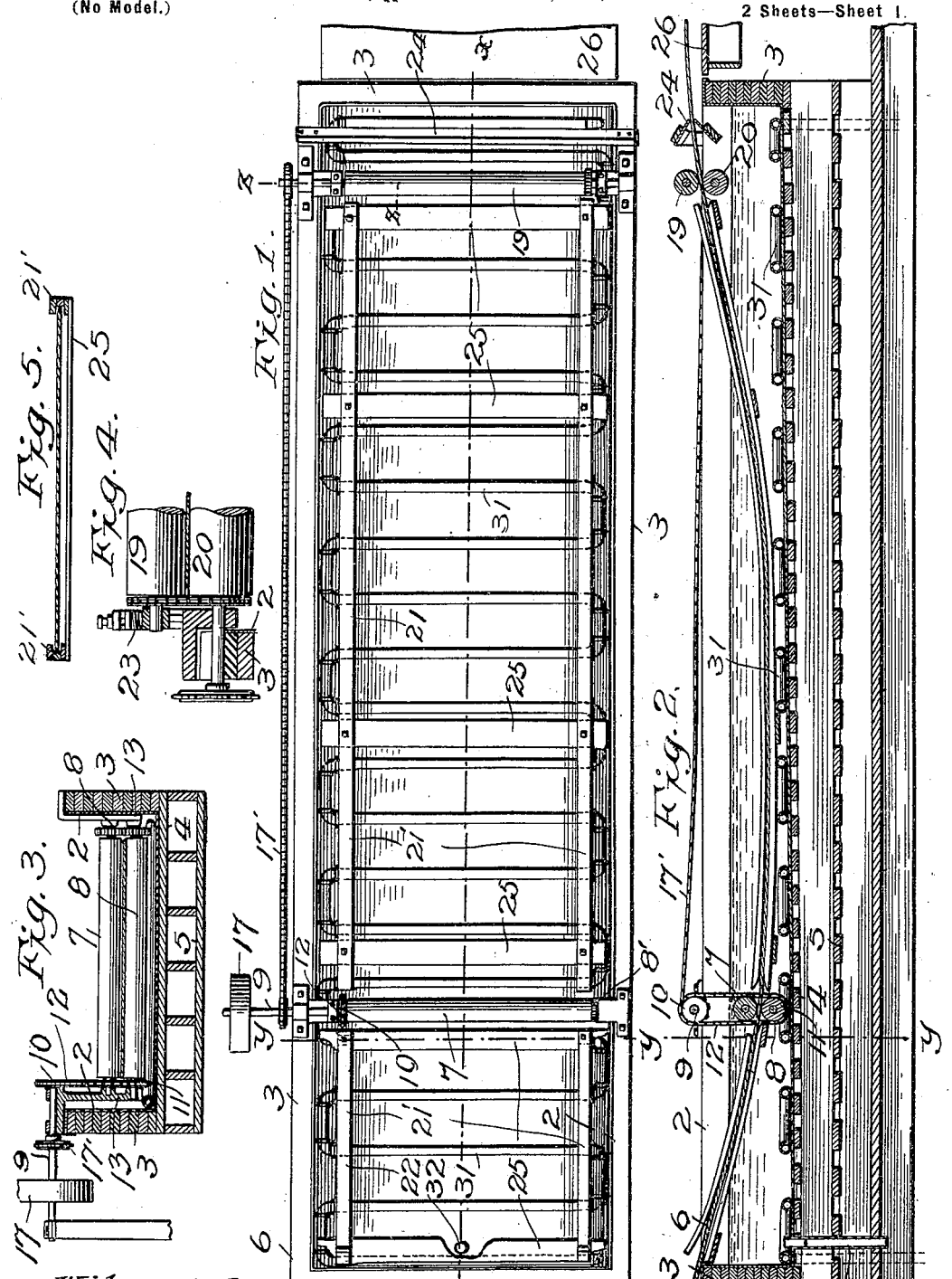

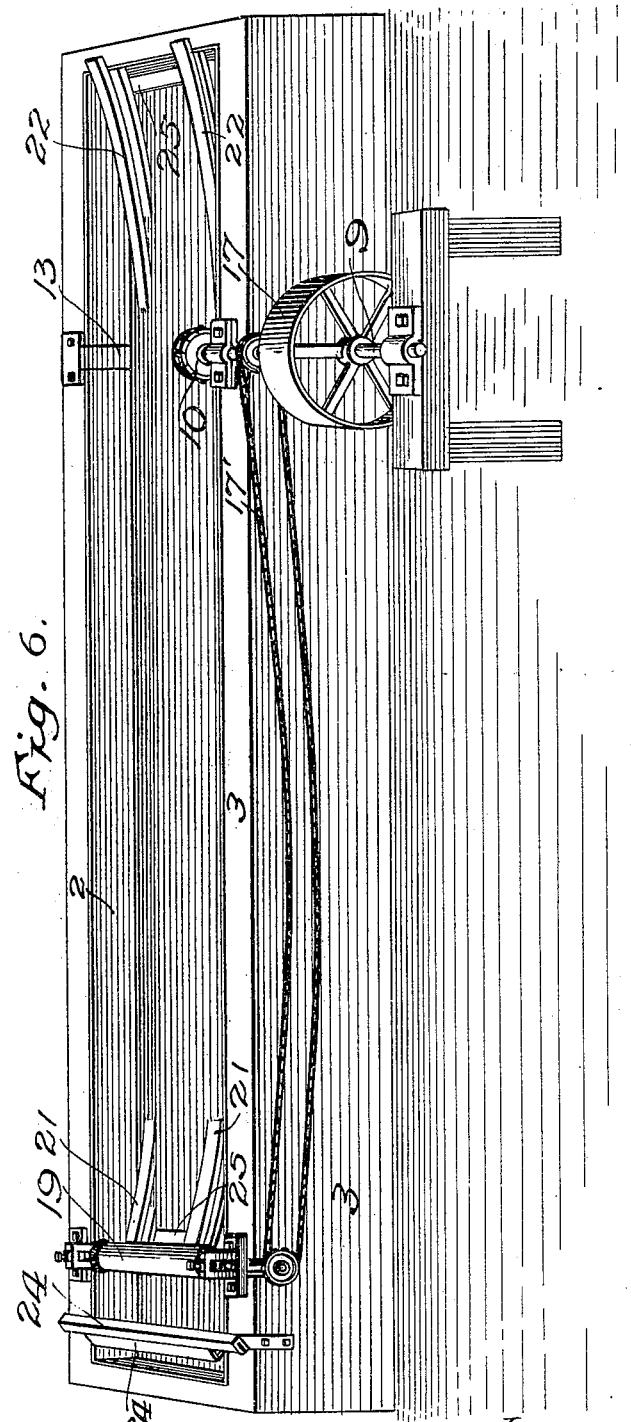

UNITED STATES PATENT OFFICE.

WILLIAM H. SPRINGER AND CHARLES J. JOHNSON, OF MINNEAPOLIS, MINNESOTA, ASSIGNORS TO CHARLES AXEL SMITH, OF SAME PLACE.

MEANS FOR WATERPROOFING COMPO-BOARD.

SPECIFICATION forming part of Letters Patent No. 645,496, dated March 13, 1900.

Application filed March 28, 1898. Serial No. 675,368. (No model.)

*To all whom it may concern:*

Be it known that we, WILLIAM H. SPRINGER and CHARLES J. JOHNSON, of the city of Minneapolis, county of Hennepin, State of Minnesota, have invented certain new and useful Improvements in Means for Waterproofing Compo-Board, of which the following is a specification.

This invention relates to means for waterproofing that article of manufacture known as "compo-board."

The object of the invention is to provide a machine that is especially adapted for preparing the waterproofing composition and for passing the wide and somewhat-unwieldy compo-boards through said waterproofing composition.

The invention consists generally in the combination of a suitable vat and heating means with board-guides provided in said vat, driving-rolls arranged in the vat to drive the boards through the same, and spreading or wringing rolls provided at the forward end of said vat and above the surface of the waterproofing composition therein, all as hereinafter described, and particularly pointed out in the claims.

The invention will be more readily understood by reference to the accompanying drawings, in which—

Figure 1 is a plan view of a waterproofing-machine embodying our invention. Fig. 2 is a vertical section thereof substantially on the line $xx$ of Fig. 1. Fig. 3 is a transverse section substantially on the line $yy$ of Figs. 1 and 2. Fig. 4 is a detail view on the line $zz$ of Fig. 1. Fig. 5 is a cross-section of the guide within the vat. Fig. 6 is a perspective view of the machine.

In the drawings, 2 represents a shallow sheet-metal vat, about which is the cribbing 3 to support the sides thereof. The tank rests upon the cross planks and timbers 4 and 5. Near the end 6 of the vat we provide the two driving-rolls 7 and 8, that are placed in the lower part of the vat to be submerged in the composition therein. These rolls are connected by gears 8', that are driven from the shaft 9 at the top of the vat, being connected therewith by a sprocket-chain 12, extending over wheels 10 and 11 upon said shaft 9 and that belonging to the lower roll 8. Said rolls 7 and 8 have their shafts held in the depending bearings or hangers 13, which are arranged within the vat and are hung from the top thereof. By means of these hangers perforations in the sides of the vat are avoided. Said shaft 9 carries the driving-pulley 17. At the opposite end of the vat we arrange another pair of rolls 19 and 20, which are above the surface of the composition in the tank, bearings therefor being provided on the top of the tank. The bearings for the roll 19 are preferably arranged in vertical guides, and said roll is pressed upon the lower roll by springs 23, arranged above the bearings of the upper roll. The shaft of the lower roll 20 and the shaft 9 are provided with sprocket-wheels, and these are connected by the sprocket-belt 17', whereby the forward pair of rolls are driven, said rolls being connected by gear-wheels. Between the pair of rolls 19 and 20 and the end of the tank we prefer to arrange the two scrapers 24, the same comprising stiff rubber or leather strips adapted to press or scrape upon opposite sides of the board as it emerges from between the rolls 19 and 20. These scrapers aid the rolls in spreading the material evenly upon the board and to take the surplus material therefrom.

21 and 22 are guide-frames removably placed and fixed in the vat by suitable lugs therein, so that they may be taken therefrom and cleaned when desired. These guides are made up of the channeled pieces 21', connected by transverse strips 25, and they carry the board downward into the lower part of the vat and thence lead it upward to the rolls 19 and 20. In the bottom of the tank is a steam-coil 31 for heating the contents of the tank. The tank may be provided with a drain-pipe 32. At the end of the tank is a table or floor 26 to receive the boards.

The vat being prepared for use is filled with rosin and paraffin in about equal proportions. When the steam is turned into the coil to heat this mixture, the paraffin cuts the rosin, and said materials combine to form a permanent composition, which when hot is liquid. After the preparation of the composition the rolls are set into operation and the wide boards are passed between the rolls 7 and 8, being guided thereto by the guides 22. As the end of the board passes through the rolls 7 and 8 and is caught thereby it is driven forward into the guides 21 and is submerged in the waterproofing compound. The rolls 7 and 8 operate at a slow speed, so that the compo-board is kept in the material for a considerable length of time. As the end of the board rises in the guides 21 it is taken between the rolls 19 and 20, and the surplus material or composition on the board is wrung or wiped therefrom by said rolls and by the scrapers 24, which leave the board thoroughly impregnated with the composition, but with an even surface having a brownish oily appearance. When ready for shipment, the lumber is thoroughly impervious to water.

Having thus described our invention, we claim as new and desire to secure by Letters Patent—

1. The waterproofing-machine, comprising the tank, suitably supported, in combination, with downwardly-curved guides in said tank, the driving-rolls provided with depending bearings or hangers, the wringing or wiping rolls, means for driving said rolls, and the scrapers, substantially as described.

2. The combination in a machine for waterproofing compo-board, of the tank or vat of sufficient length to take in a board, with the curved guides removably arranged within said vat and whereby the boards are held while passing through the vat, the submerged driving-rolls provided in and near one end of said vat, the hanger-bearings for said rolls, the chain passing down within the vat to drive the lower roll, said rolls being geared together, the pressing-rolls arranged at the other end of said vat and above the surface of the composition therein, the belt for driving said pressing-rolls, and the wipers comprising the yielding strips to engage opposite sides of the board, substantially as described.

In testimony whereof we have hereunto set our hands, this 17th day of March, 1898, at Minneapolis, Minnesota.

WILLIAM H. SPRINGER.
CHARLES J. JOHNSON.

In presence of—
C. G. HAWLEY,
M. E. GOOLEY.